March 31, 1936.  J. C. GRANFIELD ET AL  2,036,041
RESISTANCE WELDING
Filed Oct. 29, 1935

Inventors:
John C. Granfield,
Jacob J. Vienneau,
by Harry E. Dunlap
Their Attorney.

Patented Mar. 31, 1936

2,036,041

UNITED STATES PATENT OFFICE 2,036,041

RESISTANCE WELDING

John C. Granfield and Jacob J. Vienneau, Pittsfield, Mass., assignors to General Electric Company, a corporation of New York Application October 29, 1935, Serial No. 47,240

10 Claims. (Cl. 219—10)

Our invention relates to an improved method of resistance welding.

It is an object of our invention to provide an improved welding procedure for uniting the abutting end portions of sheets by means of resistance spot or line welding operations.

It is another object of our invention to provide a procedure by means of which the abutting edges of sheets of metal, the thickness of which is subject to slight variations, may be securely attached to one another by resistance spot or line welding operations.

It is a further object of our invention to provide a procedure by means of which thin electrical sheets of magnetic rolled steel may be securely joined to one another by a spot or line welding operation which does not increase the thickness of the sheets at the joint.

More particularly, our invention is an improvement on the procedure described and claimed in United States Letters Patent No. 1,773,068, Jacob J. Vienneau, August 12, 1930, for Electric welding, which is assigned to the assignee of our present invention.

Figure 1:
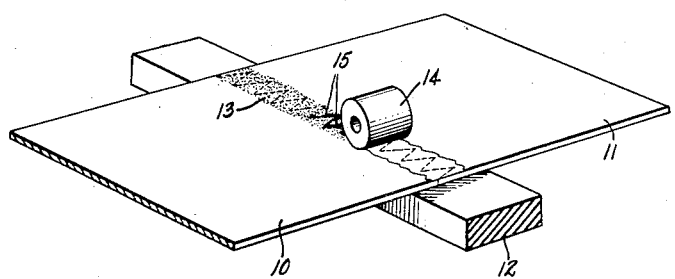
Figure 2:
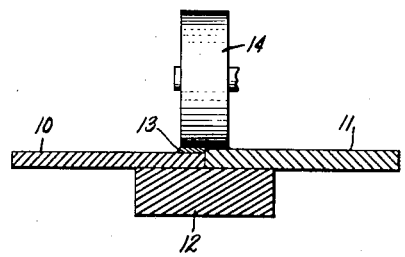

Further objects of our invention will become apparent from a consideration of the following description taken in connection with the accompanying drawing in which Figs. 1 and 2 illustrate the procedure employed.

In order to reduce the amount of material wasted in the manufacture of laminated iron cores which form parts of or the entire magnetic circuits of electrical apparatus of various types, it has been the practice to join a number of sheets together to form a strip of indefinite length from which the lamination sections for such cores are taken. By resorting to this procedure the material at each end of the sheets is effectively utilized in the making of said punchings as fully disclosed in United States Letters Patent No. 1,345,786, Masakichi Kubo, July 6, 1920, for Art of making cores for electrical apparatus, which is assigned to the assignee of our present invention.

Our invention is applicable to the formation of the straight line butt weld disclosed in the above referred to Letters Patent No. 1,345,786, or the matched tooth method of welding forming the subject matter of Letters Patent No. 1,773,068, also referred to above.

In accordance with our invention the abutting edge portions of magnetic sheets at the joint between them is covered with a thin layer of a magnetic metallic powder which corrects any uneven thicknesses of the abutted sheets, improves the path of current flow through the sheets, and fills in any voids at the joint due to the ability of the magnetic powder to place itself at the joint under the influence of the flux produced by the flow of welding current through the joint.

The presence of the powdered material at the joint also reduces during welding the sticking of the sheet material to the electrodes and this makes it possible to use electrodes for longer periods of time without renewal or resurfacing. The welding operation is also improved in that the flow of current is more regular and burnt or unwelded portions are eliminated.

When welding sheets of magnetic material we prefer to use, in accordance with our invention, pure iron powder of very fine grade. Best results have been obtained by the use of carbonyl iron powder or hydrogen reduced iron powder. Commercial iron powders of low carbon content and high purity are cheaper than the carbonyl or hydrogen iron and are being satisfactorily used in performing our invention. We have found that high resistance powders usually give poorer results than low resistance powders, thus indicating that our improved process does not depend on the resistance effect of the powder.

We prefer to apply the powdered material to the joint by brushing the edge portions of the sheet at the joint with a coating mixture of iron powder and a fluid in which the iron powder is temporarily suspended. Heavy machine oils are satisfactory for the fluid suspending medium although we prefer to use rosin oils diluted with pine oil or with free flowing mineral oils having a high flash point such as used in transformers for insulation, since in these fluids the powder does not settle out so rapidly. Furthermore, the rosin oils diluted with pine oil or free flowing mineral oils do not produce the same disagreeable fumes and odors during welding that result when glycerine, or heavy oils are used. Some fumes are produced even when using rosin oils suitably diluted but these fumes may be readily dissipated by suction or blowing and in no way interfere with the comfort of the operator performing the welding operation.

Referring to the drawing in which our invention is illustrated, two sheets of material 10 and 11, provided with matched teeth at their abutting end portions, are assembled on a fixed electrode 12 with the teeth in mesh with one another as illustrated. Over the joint thus produced a thin layer of iron powder 13 is placed and the welding operation then performed by rolling an electrode 14 progressively along a zone common to the sheets and wide enough to include the teeth of each sheet. The passage of the electrode 14 along the sheets in this manner presses the edge portions of the teeth of one sheet into and integrally unites them with the edge portions of the teeth of the other sheet.

During the welding operation the powder immediately in front of the electrode 14 is drawn across the joint between the sheets as shown at 15 by the magnetic flux resulting from the flow of welding current through the sheets. This flux pulls the powder into position along the joint as illustrated in the drawing and positions it just where it is needed to give a good path for the welding current and to be in position on melting to flow and fill up any voids at the joint. As shown in Fig. 2 the layer of powder also equalizes the thickness of the sheets at the joint. The thickness of rolled sheets varies slightly and without the use of the layer of powder the electrodes will ride on the thicker of two butted sheets causing too much current in a given area of joint which results in the burning and blowing of the metal from the joint and in consequence a defective weld. This burning and blowing of the metal also damages the contact surfaces of the electrodes and makes it necessary to replace them frequently. By the use of a surface layer of powder, in accordance with our invention, these undesirable operating characteristics are eliminated.

Our invention is particularly applicable to the welding of magnetic rolled steel having a silicon content of 5 to 7 per cent such as described and claimed in application Serial No. 528,460, William E. Ruder, filed April 7, 1931, for Magnetic sheet steel and assigned to the assignee of our present invention. In welding sheet material of high silicon content the shearing of the matched edges between which the weld is made often leaves the edges ragged. Furthermore, the flow of metal in such a hard and brittle material is greatly restricted by the thinness of the sheets. The presence of the iron powder consequently serves to fill in the voids and to supply the additional material needed for completing the joint during welding. Thus aside from providing a good contact surface and equalizing the current flow the powder also fills in any uneven places or surfaces at the joint. By using a magnetic powder the magnetic flux resulting from the flow of welding current is capable of positioning the powder at the joint where it is needed.

Although our invention is particularly suited for welding electrical sheets of high silicon content, it is, of course, apparent that the procedure is equally applicable to the welding of sheets of any material. The nature and characteristics of the powder used will in large measure depend upon the composition of the sheets being welded. Very often a powder of the same material as the sheets gives best results. For example, we have found that in welding sheets of stainless steel containing 18 per cent chromium and 8 per cent nickel a powder of this same composition will give the best results. Our invention is, consequently, not to be limited to the use of iron powder or magnetic powders.

Because our invention has been illustrated and described as applied to a line welding operation in which an electrode is rolled along the joint to be welded it is not to be limited thereto for it is also applicable to spot welding operations or line welding operations in which the weld is formed by a series of overlapping spot welds.

It will be apparent to those skilled in the art that modifications may be made in the procedure above described without departing from our invention and we aim, therefore, in the appended claims to cover all such changes and variations as fall within the true spirit and scope of our invention.

What we claim as new and desire to secure by Letters Patent of the United States is:

1. The method of resistance welding which comprises placing the edge portions of two metallic sheets in abutting relationship, placing a layer of metallic powder along the edge portions of the sheets at the joint between them, and welding the sheets together by applying pressure and current across the end portions of said sheets through said layer of metallic powder at the joint between said sheets.

2. The method of resistance welding which comprises placing in abutting relationship the matched edge portions of two metallic sheets of commercially variable thickness, equalizing the thickness of the sheets at the joint between them with a thin layer of metallic powder, and welding the sheets together by applying pressure and current across the end portions of said sheets through said layer of metallic powder at the joint between said sheets.

3. The method of resistance welding which comprises placing the matched edge portions of two metallic sheets in abutting relationship, placing a thin layer of a magnetic metallic powder along the edge portions of the sheets at the joint between them and welding the sheets together by applying pressure and current at the joint along a zone common to the sheets and wide enough to include the abutting edge portions of each sheet.

4. The method of resistance line welding which comprises placing the matched edge portions of two metallic sheets in abutting relationship, placing a thin layer of magnetic metallic powder along the edge portions of the sheets at the joint between them, and welding the sheets together by progressively rolling along a zone common to the sheets and wide enough to include the abutting edge portions of each sheet a pressure and current applying electrode.

5. The method of resistance line welding which comprises placing the matched edge portions of two metallic sheets in an abutting relationship, placing a thin layer of powdered iron along the edge portions of the sheets at the joint between them, and welding the sheets together by applying pressure and current progressively at the joint along a zone common to the sheets and wide enough to include the abutting edge portions of each sheet.

6. The method of resistance line welding which comprises cutting a plurality of interlocking teeth in the abutting edges of two metallic sheets, abutting the sheets by interlocking the teeth thus provided, placing a thin layer of magnetic metallic powder along the edge portions of the sheets at the joint between them, and welding the sheets together by applying pressure and current progressively along the zone common to the sheets and wide enough to include the teeth of each sheet.

7. The method of resistance line welding thin sheets of magnetic steel having a high silicon content which comprises cutting a plurality of interlocking teeth in the abutting edges of said sheets, abutting the sheets by interlocking the teeth thus provided, placing a thin layer of powdered iron along the edge portions of the sheets at the joint between them, and welding the sheets together by progressively rolling along a zone common to the sheet and wide enough to include the abutting edge portions of each sheet a pressure and current applying electrode.

8. The method of resistance line welding which comprises placing in abutting relationship the matched edge portions of two metallic sheets, coating the edge portions of the sheets at the joint between them with a mixture of iron powder and a fluid in which said iron powder is temporarily suspended, and welding the sheets together by applying pressure and current across the end portions of said sheets through said coating.

9. The method of resistance line welding thin sheets of magnetic steel having a high silicon content which comprises cutting a plurality of interlocking teeth in the abutting edges of said sheets, joining the sheets by interlocking the teeth thus provided, coating the edge portions of the sheets at the joint between them with a mixture of iron powder and a fluid in which said iron powder is temporarily suspended, and welding the sheets together by progressively rolling along a zone common to the sheet and wide enough to include the abutting edge portions of each sheet a pressure and current applying electrode.

10. The method of resistance line welding thin sheets of magnetic steel having a high silicon content which comprises cutting a plurality of interlocking teeth in the abutting edges of said sheets, abutting the sheets by interlocking the teeth thus provided, brushing on to the edge portions of the sheets at the joint between them a coating mixture of iron powder and a fluid in which said iron powder is temporarily suspended, and welding the sheets together by progressively rolling along a zone common to the sheet and wide enough to include the abutting edge portions of each sheet a pressure and current applying electrode.

JOHN C. GRANFIELD.
JACOB J. VIENNEAU.